United States Patent [19]

Brown

[11] 4,437,491
[45] Mar. 20, 1984

[54] VALVE PISTON

[76] Inventor: David E. Brown, 236 W. 17th St., Erie, Pa. 16512

[21] Appl. No.: 370,358

[22] Filed: Apr. 21, 1982

[51] Int. Cl.³ .............................................. F16K 15/00
[52] U.S. Cl. ................................ 137/540; 137/543.21; 251/356
[58] Field of Search .............. 137/540, 543.17, 543.19, 137/543.21, 543.23, 539; 251/356

[56] References Cited

U.S. PATENT DOCUMENTS 3,830,255 8/1974 Freiheit .................................. 137/539
4,129,144 12/1978 Andersson ....................... 137/543.21
4,257,443 3/1981 Turney ............................ 137/543.19

FOREIGN PATENT DOCUMENTS 364703 1/1932 United Kingdom ........... 137/543.17

Primary Examiner—Alan Cohan
Assistant Examiner—Mark Malkin
Attorney, Agent, or Firm—Charles L. Lovercheck; Wayne L. Lovercheck; Dale R. Lovercheck

[57] ABSTRACT

A piston for use in spring-closed valves whose semitoroidal shape minimizes the possibility of the piston jamming during tipping motions while providing maximum guidance, sealing area and maximum bearing material for resisting side wear.

6 Claims, 5 Drawing Figures

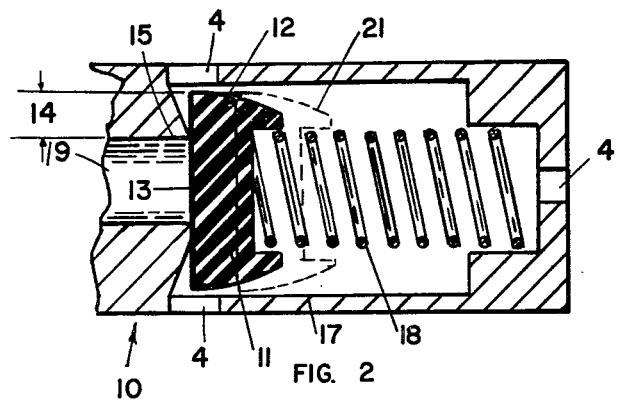
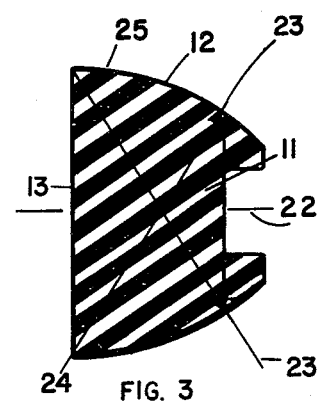
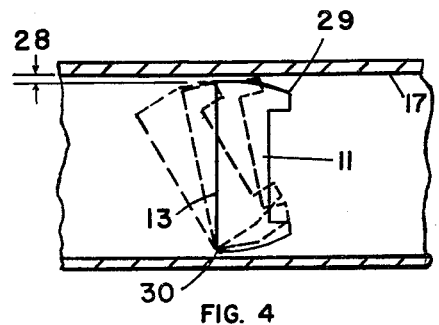
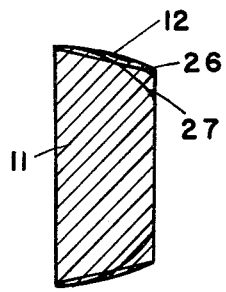

VALVE PISTON

BACKGROUND OF INVENTION

Check valves are typical of a large number of valve types that employ spring-closed pistons often of polymeric materials which are guided by a surrounding body member. Most present designs employ pistons of generally cylindrical shape. When large tipping displacements occur, many of these pistons jam due to their diagonal dimensions being larger than their guide member's inside diameter. Efforts to reduce jamming have employed small piston diameters, large end chamfered pistons of spherical shaped sides. All of these significantly reduce the end sealing surface. Some piston designs increase the piston to body clearance sufficient to avoid jamming, but this causes reduced piston to seat overlap and loss of sealing insurance. Some designs employ tapered pistons which reduces necessary bearing material for resisting side wear. Such wear results in loss of seat/piston overlap for sealing. As a tapered piston tips slightly, its ability to guide is reduced as its guide-end edges move away from the body guide member. An ideal piston for spring-closed valves would then have maximum front end sealing surface, be contoured to totally eliminate jamming, and provide maximum material along the sides to resist bearing surface wear with its resultant loss of seal surface, but hold guidance constant during tipping motions.

The piston disclosed herein differs from other present inventions in that as the piston tips during normal displacements, the effective guide diameter of the piston remains constant, thereby both eliminating jamming and maintaining constant piston guidance in the body guide member.

The sealing end of the piston is maintained as the largest diameter of the piston, yielding maximum seat/piston overlap to insure effective sealing. Piston side material is maximized to resist bearing wear-caused loss of side material and seal diameter size. The above benefits are accomplished by using a unique semi-toroidal shape for the piston side shape described herein.

SUMMARY OF THE INVENTION

An object of the invention is to provide a piston shape which will not increase or decrease in effective size in its body guide member as it undergoes normal moderate tipping displacements. This result will inherently prohibit piston jamming.

Another object of the invention is to provide a piston shape where the sealing end size is maximum.

A further object of the invention is to provide a piston shape which, while satisfying the above objects, also maximizes the bearing material on the piston sides to resist wear.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor detail of construction without departing from the spirit or sacrificing any of the advantages of the invention.

GENERAL DESCRIPTION OF DRAWINGS

FIG. 2 illustrates a typical spring-closed type of valve having a piston as described in this invention.

FIG. 3 illustrates the construction of the piston side curved, semi-toroidal, surface.

FIG. 4 illustrates the constant piston/body clearance of the piston of this invention during normal amounts of piston tipping.

FIG. 5 illustrates the increased side bearing and guidance material of the piston of this invention over more conventional design pistons.

DETAILED DESCRIPTION OF THE INVENTION

Figure 1:
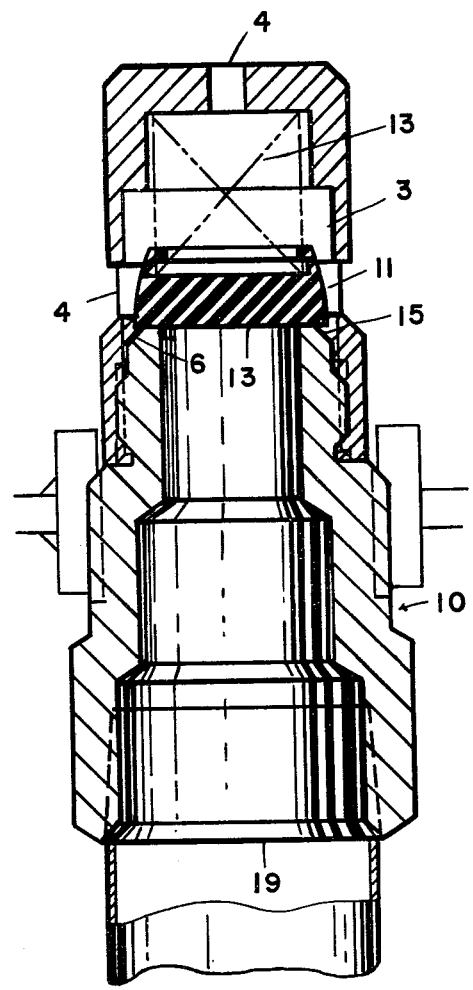
FIG. 1 is a longitudinal cross sectional view of a valve with a piston according to the invention.

Now with more particular reference to the drawings. (See FIGS. 1 and 2) The valve shown in several figures of the drawing, has a body 10 with an outlet opening 4 and an inlet opening 19. The piston 11 is supported in a cylindrical cavity 3 in the body between the inlet 19 and outlets 4. The body has a first shoulder 15 adjacent the inlet end of the body. The piston 11 has an outside surface 12 in the shape of a toroid, and the upstream side of said piston being flat and adapted to engage said first shoulder. A spring 18 is supported in said body adjacent said outlet end and said spring engages a counterbore 22 (see FIG. 3) in said piston. In the spring closed valve (FIG. 1) the normal position of the piston 11 is with the sealing face 13 engaged tightly against the valve seat 15. Seal tightness is a function of the smoothness of seat 15 and seal face 13, minimum seal overlap 14 when piston 11 is shifted radially to contact bearing inside surface 17, and the net force holding the piston 11 against the seat 15 which is the sum of the spring 18 force and the seating force occurring when the pressure at the valve outlet 4 is greater than the inlet 19 pressure. The prime purpose of many such valves is to *retain the pressure* built up in the outlet system when the source of that pressure, supplying the inlet 19, is turned off or reduced. Should the piston 11 in such valves not close or seal against the seat 15, their primary function has failed, and system malfunction can occur.

Such valves move to an open position 21 in FIG. 2 when the pressure in the inlet 19 is larger than the outlet 4 pressure by an amount sufficient to move the piston and compress the spring 18. As the valve piston 11 moves to the open position 21 flow occurs from inlet to outlet. The flow causes oscillating motion of the piston which now is supported only by fluid/gas flow forces, the forces of the spring 18 behind it and varying contact with the body bearing 17. This varying side and axial motion sets up tipping oscillations of the piston. Adhesion and surface irregularities on the bearing and piston 11 sides can cause one side to hold farther open momentarily. This adds to the frequency and magnitude of piston tipping motions.

Referring to FIG. 3, the piston is formed having a flat seating face 13 at one end. This is the largest diameter of the piston 11. The unique side contour of this piston 11 is formed by constructing a radius 23 whose center is located along the outer periphery of the front sealing face 13. The unique side contour 25 of this inventon is generated by rotating this contour 25 about piston axis 22 so that it is produced uniformly all around the side periphery of the piston. This results in the unique capability of this piston to allow significant angular tipping motions inside a cylindrical cavity such as cavity 17 and maintain constant clearance between the piston 11 and cylindrical cavity inside the body 17. Tipping motion in any direction results in constant guidance and freedom from jamming that is a result of binding against the bearing.

FIG. 4 shows piston 11 in body bore 17 undergoing significant tipping motion and how constant clearance 28 with the body results for all positions until back edge 29 tips forward to a position ahead of opposite front edge 30.

FIG. 5 shows in the cross sectioned area the maximized material for guidance and wear resistance in the contour of the piston according to the invention over tapered contour 26 or spherical contour 27 shapes that could be equally jam-free. These other forms do not provide constant guidance during tipping motions.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve having a body with a generally cylindrical cavity having an inlet and an outlet adapted to be connected in a fluid line,
   a valve seat in said cavity around said outlet,
   a valve plunger in said cavity said plunger having a generally flat generally circular end adapted to rest on said valve seat,
   said plunger having an outside contoured surface joining said flat end,
   said outside surface being contoured so that an arc follows said contour when said arc has a center of curvature at any point on the outer periphery of said flat end and said arc has a radius passing through a plane extending perpendicular to said flat end and containing the central axis of said plunger.

2. The valve recited in claim 1 wherein said flat face is of a larger diameter than the diameter of said plunger in any plane passing through said contoured surface in a plane parallel to said flat surface.

3. The valve recited in claim 1 wherein said piston has a flat end opposite said flat surface.

4. The valve recited in claim 3 wherein a spring rests on said piston on said end opposite said flat face.

5. The valve recited in claim 4 wherein said end of said piston opposite said flat face is recessed and said spring is received in said recess,
   said spring engages said body and exerts a pressure on said piston.

6. A piston for a check valve said piston having a generally flat, generally circular end adapted to rest on a valve seat,
   said piston having an outside contoured surface joining said end,
   said outside surface being contoured so that an arc follows said contour when said arc has a center of curvature at any point on the outer periphery of said flat end and said arc has a radius passing through a plane extending perpendicular to said flat end and containing the central axis of said plunger.

* * * * *